(12) United States Patent
Gerres et al.

(10) Patent No.: US 6,604,752 B1
(45) Date of Patent: Aug. 12, 2003

(54) FRONT END HYDRAULIC HITCH ATTACHMENT

(76) Inventors: Ronald F. Gerres, 109 Hillcrest Dr., Belle Plaine, MN (US) 56011; Steven M. Gerres, 109 Hillcrest Dr., Belle Plaine, MN (US) 56011

( * ) Notice: Subject to any disclaimer, the term of this patent is extended or adjusted under 35 U.S.C. 154(b) by 0 days.

(21) Appl. No.: 10/117,376

(22) Filed: Apr. 5, 2002

(51) Int. Cl.⁷ ................................................. B60D 1/04
(52) U.S. Cl. ..................... 280/415.1; 280/515; 414/680
(58) Field of Search .................. 414/723, 724, 414/680, 685; 280/415.1, 416.1, 515

(56) References Cited

U.S. PATENT DOCUMENTS

| | | |
|---|---|---|
| 3,753,508 A | 8/1973 | Carpenter |
| 3,984,016 A | 10/1976 | Kuhn |
| 4,015,855 A * | 4/1977 | Murray ..................... 280/415.1 |
| 4,037,681 A | 7/1977 | Gorby |
| 4,117,944 A | 10/1978 | Beckstrom et al. |
| 4,431,207 A | 2/1984 | Langenfeld et al. |
| 5,097,609 A | 3/1992 | Swaggert |
| 5,730,227 A | 3/1998 | Hund |
| 5,967,738 A | 10/1999 | Warthold |
| 6,119,377 A | 9/2000 | Rubio |

* cited by examiner

*Primary Examiner*—Donald W. Underwood
(74) *Attorney, Agent, or Firm*—R. C. Baker & Associates, Ltd.

(57) ABSTRACT

The hitch attachment has a base plate with a toe-heel receiver for the attachment carrier of a front end loader on one face side and a hydraulically operable hitch on the other face side. The hydraulically operable hitch has a draw bar extending out from the base plate with a hitching opening at its outer end. A boom mounted to the upper edge of the base plate projects angularly upward to an elevated location above the hitch opening of the draw bar, and a hydraulic ram assembly equipped with a hitching pin is removably suspended from the outer end of the boom. A mid-level assembly has a circumscribing bracing structure that holds the hydraulic ram assembly in stable condition for the entry of the hitching pin into the hitching opening of the draw bar. A removable link in the circumscribing bracing structure facilitates easy removal of the hydraulic ram assembly for replacement.

8 Claims, 2 Drawing Sheets

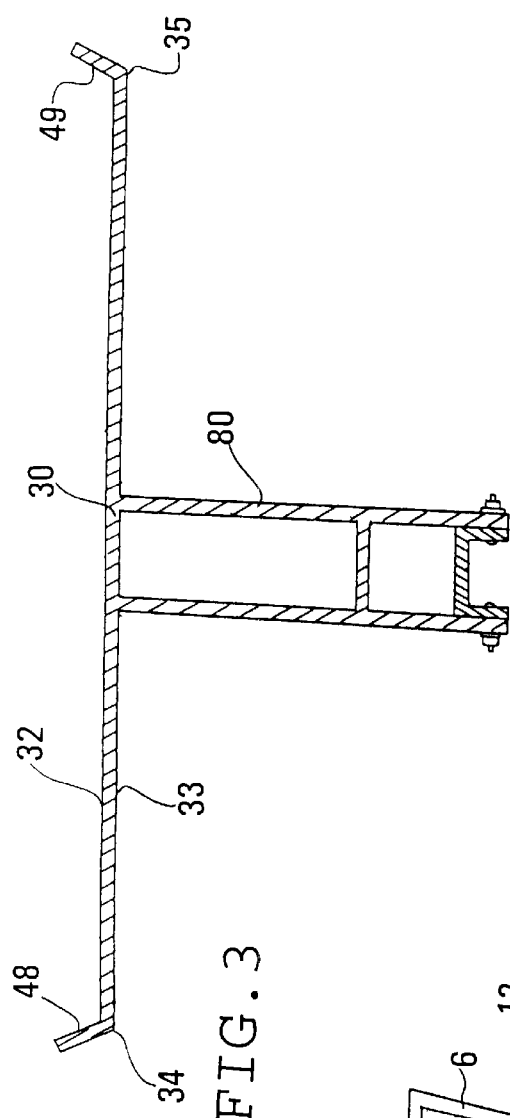
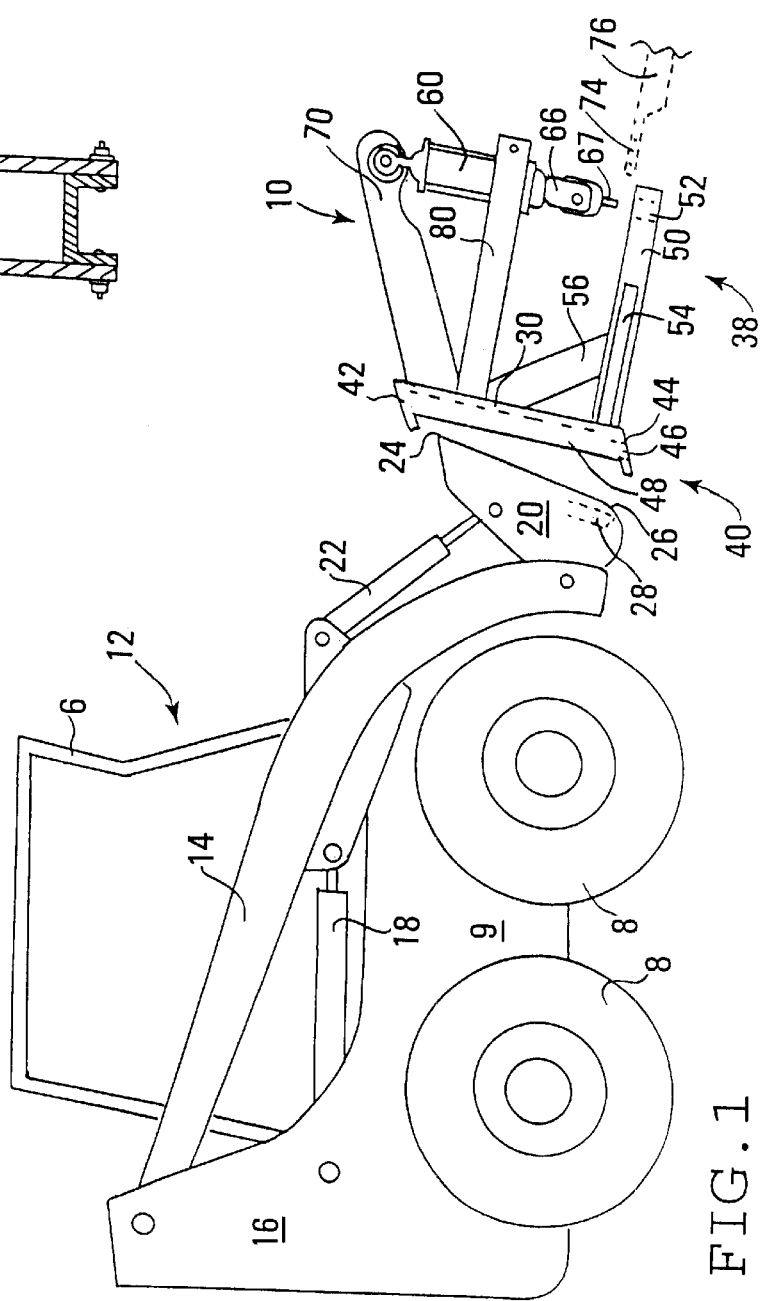

FRONT END HYDRAULIC HITCH ATTACHMENT

This invention relates to a front end hydraulically operable hitch attachment, and more particularly to a hydraulically operable front end hitch attachment easily mounted on a hydraulically adjustable attachment carrier of a front end loader.

Front end skid steer loaders (such as those known under the name "BOBCAT"), while relatively small in size as compared to many tractors, are exceedingly powerful and versatile. They are strikingly popular, and a multitude of attachments have been developed that can be quickly attached to the attachment carrier at the front end of the loader. The multitude of known attachments that are available include augurs, backhoes, brooms, buckets, trenchers, cutters, chippers, concrete mixers, crushers, diggers, dozer blades, graders, rakes, pallet forks, snow blowers, tillers, scrapers, etc. Thus, an almost endless variety of attachments are available.

Despite the wide popularity and long and versatile use of front end loaders and the multitude of attachments designed particularly for them, there is nothing that could ever suggest a front end hydraulically operated hitch attachment. Instead, users have been left with manual hitching techniques that involve a requirement that the user get out of the cab and accomplish hitching by hand every time a towable vehicle is to be moved by a front end loader. Even then, past practice has left the user with severe limitation of angular movement simply because holes or the like in earth-moving buckets attached to front end loaders, while crudely effective for accomplishing a hitch to a towable vehicle, tend to limit the range of angular movement for a towable vehicle during towing action and are no solution at all to the problem of quickly hitching and moving a multitude of towable vehicles and aligning and realigning them for any particular storage or display or other purpose.

In short, it appears that the long and widespread need for quick and easy cab-controlled hitching and unhitching, using a front end loader for the added front view visual convenience it gives the operator, has been left unmet.

SUMMARY OF THE INVENTION

The invention provides a hydraulically operated front end hitch attachment easily mounted on the attachment carrier of a front end loader. The hitch attachment has a base plate equipped with a toe-heel receiver for a front end toe-heel attachment carrier on one face side and a hydraulically operated hitch attachment on the other face side or opposite side of the base plate.

The toe-heel receiver on the first side of the base plate has an upper lip flange projecting downwardly from the upper edge of the base plate so as to form an acute angle with respect to the base plate and a lower lip flange projecting downwardly to form an obtuse angle at the base or lower edge of the base plate, plus one or more openings for receiving locking wedges of the attachment carrier at the front end of the loader.

The hydraulically operated hitch on the second or other side of the base plate is exceedingly frugal in its components, even Spartan, with minimal but highly effective bracing. It has a lower hitch component and an upper hitch component.

The lower hitch component has a draw bar equipped with a hitching hole at its outer end.

The upper hitch component has an outwardly and upwardly extending boom with a hydraulic ram assembly suspended from the boom and braced by a mid-level bracing structure that circumscribes the cylinder of the hydraulic ram assembly and holds it in stable condition for a hitch pin at the-end of the ram to enter the hitching hole of the draw bar.

A removable link in the circumscribing structure permits replacement of a hydraulic ram assembly that is worn.

Other benefits and advantages of this invention will become evident as this description proceeds.

DESCRIPTION OF THE DRAWINGS

FIG. 1 is a schematic side view of a front end loader with a hitch attachment of the invention in spaced relationship to it so as to more clearly allow illustration of the toe-heel attachment carrier on the front end loader and the toe-heel receiver on the hitch attachment of the invention; this figure also includes a phantom view of the tongue and hitching hole for a towable vehicle;

FIG. 3 is a schematic top view of a cross-section through the mid-level bracing structure for holding the hydraulic ram assembly in rigid orientation.

DETAILED DESCRIPTION OF THE INVENTION

Figure 2:
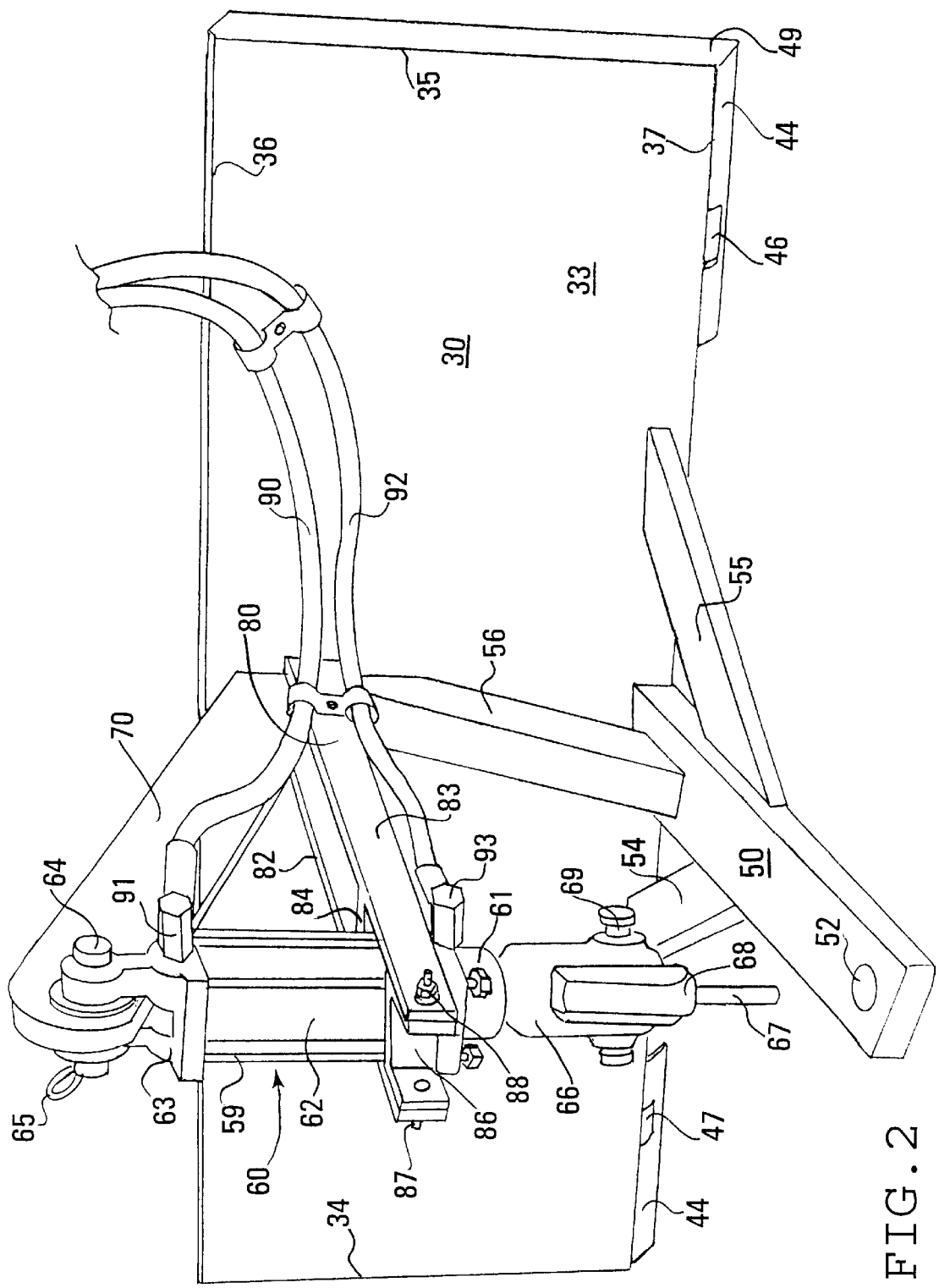
FIG. 2 is a schematic perspective view of the hitch attachment of the invention as viewed from the side of the base plate where the hydraulically operated hitch is located.

Some basic features schematically illustrated in FIG. 1 will first be discussed to set the environment for this invention.

The characteristic front end loader 12 has wheels 8 on opposite sides of a body 9, and the wheels are driven independently in that one side can be driven at a different speed from the other side so as to turn the loader in a manner commonly called skid steering. The cab 6 or operator's compartment has an assembly on each side of it that includes a lift arm 14 pivotably mounted to a stanchion 16 at the rear, and a hydraulic ram 18 pivotably mounted at its ends to the stanchion and to the lift arm. An attachment carrier 20 is pivotally mounted at its lower end on the lift arm at its curved lower end and is angularly adjustable by a hydraulic ram 22 pivotally mounted at its ends to an upper portion of the lift arm and an upper portion of the attachment carrier. Illustrative key features for the attachment carrier can take a variety of structural forms, as well known in the art and as, for example, illustrated in U.S. Pat. No. 3,753,508 of Aug. 21, 1973 to Carpenter, and U.S. Pat. No. 3,984,016 of Oct. 5, 1976 to Kuhn and assigned to Clark Equipment Company, both of which are here incorporated by reference. In essence, the attachment carrier has a toe-like structure 24 at its upper edge and a heel-like structure 26 at its lower edge, and a pair of locking wedges 28 laterally spaced at its lower edge. For simplicity's sake, the attachment carrier is conveniently referred to as a toe-heel attachment carrier since it has a toe and a heel that are fundamental to its structure (whether by way of a framing or by the use of solid metal material to create the toe and heel carrier features).

The ease with which the attachment carrier 20 can be elevated and tilted by hydraulic rams on the front end loader should be especially noted.

Referring to FIGS. 1–3 and particularly to FIG. 3, a critical feature of the new hydraulically operable hitch attachment 10 is a base plate 30 having opposite face sides 32, 33 and lateral edges 34, 35 and an upper edge 36 and a lower edge 37. On one face side of the base plate is the toe-heel receiver 40 that is adapted to receive the toe-heel attachment carrier of the front end loader. On the other face side is a hydraulically operable hitch 38 of the hitch attachment of the invention.

The toe-heel receiver 40 has a toe receiver portion or part formed by an upper lip flange 42 (see FIG. 1) that projects downwardly from the upper edge 36 of the base plate 30 at an acute angle with respect to the side of the base plate that has the toe-heel receiver 40. The heel part of the toe-heel receiver is formed by a lower lip flange 44 projecting downwardly from the lower edge 37 of the base plate to form an obtuse angle with respect to the side of the base plate forming the toe-heel receiver. The upper lip flange 42 and the lower lip flange 44 need not extend continuously along the upper and/or lower edges of the base plate. It is only important to have the flange extend sufficiently to serve as a mate for receiving the mateable parts of the toe-heel attachment carrier. An important feature of the heel flange 44 of the toe-heel attachment carrier is that it should have an opening 46 (and preferably an additional opening 47) for receiving a locking means or wedge 28 or wedges carried by the toe-heel attachment carrier. Thus, the toe edge 24 of the attachment carrier is inserted by an operator of the front end loader into the toe receiver portion 42 of toe-heel receiver 40 and the heel portion of the attachment carrier 20 is inserted in the heel receiver portion 44 of the toe-heel receiver 40, followed by extending a plunger or a lock wedge or other locking means 28 into an opening 46, 47 of the heel receiver portion 44. The toe-heel attachment carrier of the front end loader is thus fixed to the toe-heel receiver 40 of the hydraulically operable front end hitch attachment 10, with the toe-heel receiver 40 effectively mounted upon the toe-heel attachment carrier 20 and locked to the attachment carrier so that adjustment of the attachment carrier effectively adjusts the entire hydraulically operable front end hitch attachment of the invention as a unit in both tilt and elevation.

Lateral edges 34 and 35 of the base plate are suitably equipped with guidance flanges 48, 49 (see FIGS. 1, 2, and 3) projecting a short distance angularly outward from the lateral edges 34,35. The function of such guidance flanges is simply to assist accurate registration of the toe-heel attachment carrier 20 on the toe-heel receiver 40 at the time the two are mounted together.

As used herein, the term "edge" in "lateral edge" for edges 34 and 35 and the term "edge" in "upper edge" 36 as well as "lower edge" 37 all refer to the operable perimeter of the base plate 30. The base plate need not be larger than those edges, as illustrated, although it would not depart from the invention to employ even larger plate sizes beyond such a perimeter (and thus needlessly incur the extra expense in doing so). The critical point is that the term "edge" refers to the size of the plate that is important for the functions described, and particularly for the mounting on the carrier 20. That size is generally determined by the characteristics of the toe-heel attachment carrier of a front end loader. Illustratively, an ideal base plate will have a width between its lateral edges of about 44 inches and the height between its upper and lower edges of about 17 or 18 inches. While the lateral width of the base plate can vary tremendously, the height generally will not vary outside of a range of 15 inches up to 25 inches even when specially modified for an unusual toe-heel attachment carrier for a front end loader. Further, the term "plate" for the new attachment is intended to embrace variations of structures including frame elements. Preferably, however, the base plate 30 will be of continuous metal structure as distinct from a frame type.

On the hitch face side 33 of the base plate 30 are elements of the new hydraulically operable hitch, and these elements in essence comprise a draw bar assembly 50, a hydraulic ram assembly 60, a boom 70 for suspending the hydraulic ram assembly, and a mid-level assembly 80.

The draw bar assembly has a draw bar 50 that extends perpendicularly outward from the hitch face side 33 of the base plate 30 opposite the toe-heel receiver side 32. (The hitch side sometimes is called the "other" side when the toe-heel receiver side is referred to as the "one" side or first side.) The draw bar 50 has an inner end that is permanently united in a rigid manner to the base plate 30 at a medial location between the lateral edges 34, 35 of the base plate and proximate to (i.e., close to) the lower edge 37 of the base plate 30. It is not absolutely critical to have the inner end at a location exactly on the lower edge of the base plate. But it is important to have the draw bar extend from the base plate at some location rather close to the lower edge 37 of the base plate simply because of the added structural features that must be separately supported above the draw bar 50. Draw bar 50 is equipped at its outer end with a hitching opening 52, generally a hole that extends vertically through the draw bar. The distance between the hitching opening 52 and the inner end of the draw bar united to the base plate can vary, but it should be at least about 15 inches and not over about 30 inches. A good distance is about 20 to 22 inches.

No matter how rigidly a draw bar is welded to the base plate, the forces to which a draw bar is subjected can be immense. For that reason, bracing of the draw bar is highly desirable, and the bracing as illustrated in FIGS. 1 and 2 is commendable. Lateral brace arms 54, 55 are permanently united laterally on the draw bar at a location between the ends of the draw bar and extend to, and are permanently rigidly affixed at, locations on the base plate spaced laterally away from the draw bar inner end at its welding to the base plate. (The bracing is triangular, with the draw bar as one leg, the lateral brace arm as another, and the base plate as the final leg of the triangle.) Welding is a common expedient to accomplish rigid permanent attachment; but with advances in technology, it may not be unheard of to have components made of plastics that resemble metal and have permanent unions or affixation of parts by adhesives as distinguished from welds. Ideally, lateral brace arms 54, 55 are united to the draw bar 50 at a location approximately midway between the hitching opening 52 and the base plate 30, and then branch or fan out—each at an angle between 30 and 60 degrees (e.g., approximately 45 degrees) with respect to the draw bar. They end up at lateral sites on the base plate at which they are permanently rigidly fixed. An upper brace arm 56 is permanently united to the draw bar at a location closer to the base plate than to the hitching opening and angularly extends upward from the draw bar to a location on the base plate above the inner end of the draw bar. Upper brace arm 56 typically may angle upward at a steeper angle from the base plate (but not over 65 degrees) than the angle of the lateral brace arms 54, 55. Brace arms 54, 55, and 56 are designed to effectively brace the draw bar in a strong rigid condition with respect to the base plate.

Hydraulic ram assemblies are extremely well known and can take a variety of specific forms. A useful hydraulic ram assembly 60 for practicing the invention is one having a hydraulic cylinder 62 at one end and a hydraulic ram 66 at the other end. The cylinder end is equipped with a terminal structure 63, and it is from this structure 63 that the ram assembly is suspended. The ram end 66 is extensible and retractable with respect to the cylinder and is equipped with a terminal hitching pin 67. For the ideal practice of the invention, hitching pin 67 is removably mounted on the ram 66. An illustrative but certainly not the only way of removably mounting a hitching pin 67 on a ram is illustrated in the drawings, particularly at FIG. 2. There the ram 66 is forked and the flattened and enlarged head 68 of pin 67 is inserted between the forks and held in place by a locking shaft 69 extending between the forked ends of the ram and through the head 68 of the pin. The head 68 of the pin is snugly fitted into the fork of the ram and has a shape (e.g., a square shape) which prevents pivot action about the axis of the locking shaft 69 and keeps the pin 67 in alignment with the ram 66 and the piston rod (not shown) as the ram is extended and retracted with respect to the cylinder 62. A removably mounted pin 67 is important as it allows for continuous use of good pins when worn out hydraulic rams and their cylinders are changed, and easy change of damaged pins when no need exists to change hydraulic cylinders and rams.

A boom 70 for the hitch side is a critical element for suspending the hydraulic ram assembly in depending condition. The boom 70 is in the nature of a weight-supporting arm permanently and rigidly united at its inner end to the base plate at a location proximate to the upper edge of the base plate. The location need not be exactly at the upper edge, but it should be close to the upper edge 36. Further, a location proximate to the upper edge 36 should be directly above the end of the draw bar 50 united to the base plate. The boom projects angularly upward and outward from the base plate from its permanent rigid mounting to the base plate. The outer end of the boom ends up at an elevated location above the upper edge 36 of the base plate and above the hitching opening 52 of the draw bar. The upward slope of the boom from the welded mounting of its inner end to the base plate is quite gradual, but is at least 10 degrees and preferably in the range of about 20 to 25 degrees but generally need not be more than 35 degrees above an imaginary line perpendicularly outward from the base plate from the welded inner end of the boom. To be noted is the fact that a vertical plane extending the length of draw bar 50 and bisecting draw bar 50 would also bisect boom 70 in the ideal and most preferred practice of this invention.

Boom 70 at its outer end has a hole extending horizontally and transversely through it. The hole is not shown in the drawings, but pin shaft 64 extends through holes in the bifurcated or forked end of the terminal structure 63 and through the hole in the outer end of boom 70. That pin shaft 64 is fastened against dislodgment during use of the hitch, and a suitable fastening may be a cotter pin 65 or the like. The upper end of the hydraulic cylinder (carrying terminal structure 63) may be referred to as the butt end of the hydraulic cylinder, and the opposite end of the hydraulic cylinder from which the ram rod is extensible and retractable may be referred to as the head end 61. Between the head end 61 and butt end 63, strengthening rods 59 (one at each quadrant about cylinder 62) may be employed to hold the head and butt ends together, if desired.

Of great significance is that the hydraulic ram assembly 60 of cylinder 62 and ram 66 and associated elements is removably mounted at its butt end or terminal structure 63 in a suspended condition from the outer end of boom 70 and forms an acute angle with respect to boom 70 because of its suspended condition.

But the hydraulic ram assembly is not allowed to swing like a pendulum from its suspended mounting on pin shaft 64. Instead, that assembly is held in condition for the hitching pin 67 to pass into the hitching opening 52 of the draw bar on extension of the hydraulic ram 66. Holding the hydraulic ram assembly in that posture or condition is accomplished by a special mid-level bracing assembly 80.

The mid-level assembly 80 has a bracing structure 82, 83 mounted to the base plate 30 at a location proximate to the union of the inner end of the boom to the base plate and clearly well above the inner end of the draw bar. This bracing structure extends outward from its inner end mounting to a circumscribing base structure that surrounds the hydraulic cylinder at a location spaced downwardly from its suspension mounting. The circumscribing bracing structure illustratively may be made up of laterally spaced bracing arms 82 and 83 that extend perpendicularly outward from their inner end union to the plate 30 and pass on each side of the hydraulic cylinder 62. A cross bar brace 84 extends between bracing arms 82 and 83 to hold cylinder 62 against shifting pendulum movement toward plate 30. Cross brace 84 and the outer length or extensions of the braces 82 and 83 form a U-shaped space or recess that accommodates the cylinder 62. At the outer end of the arms 82 and 83 is a removable link 86 having a cross bar section plus outer flange edges that are united to the outer ends of the braces 82 and 83 by nuts and bolts 87 and 88 or other fasteners.

The key point is that the mid-level assembly not only is a mid-level bracing structure mounted at its inner end to the base plate as described but also is a circumscribing bracing structure (e.g., of elements 82, 83, 84, and 86) that surrounds the hydraulic cylinder 62 at a location downward from the suspension mounting of it (e.g., the circumscribing structure is about the hydraulic cylinder at a location proximate to its head end or ram extension end). The link 86 is capable of being temporarily removed to allow removal of the hydraulic ram assembly from the mid-level bracing structure and replacement of a different hydraulic ram in the mid-level bracing structure. (Of course, the suspension mounting on the boom 70 also permits such replacement.) It is this mid-level bracing structure that holds the hydraulic ram assembly in stable condition effectively aligning the extension of the ram end for entry of the hitching pin 67 into the hitching opening 52 of the draw bar. Ideally, the mid-level bracing structure elements extend from their inner end mounting on the base plate in a parallel or near-parallel relationship to the draw bar.

Hydraulic conduits 90 and 92 provide for the movement of hydraulic fluid through elbows 91 and 93 as it enters and exits cylinder 62 (depending, of course, upon the direction of the fluid flow to effect extension and retraction of the ram 66). The conduits 90 and 92 are connectable to an auxiliary hydraulic system on the front end loader and are controlled by an operator from a switch in the cab of the front end loader. All of these details are not illustrated in the drawing since the operator-controlled auxiliary hydraulic system of a front end loader is well known to those skilled in the art.

What is significant, however, is that the control of the new front end hydraulically operable hitch attachment by an operator from the cab of a front end loader permits the operator to hitch and unhitch towable vehicles to the hitch attachment while the operator remains in the cab of the front end loader. This permits a considerable saving of time for an operator who has to hitch and unhitch a multitude of vehicles to move them for work purposes or transport purposes or storage or display. In fact, it saves a considerable amount of time also for an operator who simply has to hitch and unhitch a single towable vehicle. Heretofore, the operator has necessarily been required to leave the cab to accomplish manual hitching (as in those cases where a hole has been drilled in a bucket for the purpose of hitching a vehicle to tow it or move it). Too frequently, after an operator believes everything is aligned for easy accomplishment of a manual hitch, it turns out that the operator has to re-enter the cab for movement of the front end loader closer to the possibility for proper alignment for a hitch connection. This invention permits the operator to view from the cab the exact location of the hitch draw bar 50 in relation to the hitch connection or hole 74 of a tongue 76 (see phantom of FIG. 1) on a towable vehicle. As is well known, the tongues of towable vehicles frequently are provided with depending foot supports (or stops or springs) to keep the tongue somewhat elevated and in readiness for connection with a draw bar for towing. In essence, this invention provides a great laborsaving attachment that permits speedy hitching and unhitching of towable vehicles to a front end loader.

Those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description, and all variations that come within the meaning and range of equivalency of the claims are therefore intended to be embraced thereby.

That which is claimed is:

1. A hydraulically operable front end hitch attachment easily removably mountable onto the toe-heel attachment carrier of a front end loader, said hitch attachment consisting essentially of a vertically orientable rectangular base plate having opposite face sides and lateral edges and upper and lower edges, a toe-heel receiver on one said face side, said toe-heel receiver being adapted to receive and be locked to the toe-heel attachment carrier of a front end loader, and a hydraulically operable hitch on the other said face side, said hydraulically operable hitch consisting essentially of a draw bar assembly, a boom, a hydraulic ram assembly suspended from said boom, and a mid-level assembly for bracing said hydraulic ram assembly, (a) said draw bar assembly having a draw bar extending perpendicularly outward from said base plate and permanently united at its inner end to said base plate at a medial location between the lateral edges of said base plate and proximate to the lower edge of said base plate, the outer end of said draw bar being equipped with a hitching opening, (b) said boom having inner and outer ends, said boom being permanently rigidly united at its inner end to said base plate at a location proximate to the upper edge of said base plate and projecting angularly upward and outward from said base plate to an elevated outer end location above said hitching opening of said draw bar, (c) said hydraulic ram assembly having a hydraulic cylinder at one end and a hydraulic ram at the other end, said cylinder end being equipped with a terminal structure by which said ram assembly is suspended from said elevated outer end of said boom so as to form an acute angle with said boom, and said ram end being extensible and retractable and being equipped with a terminal hitching pin, and (d) said mid-level assembly comprising a bracing structure mounted to said base plate at a location proximate to the union of the inner end of said boom to said base plate and extending outward therefrom to a circumscribing bracing structure that surrounds said hydraulic cylinder at a location spaced downwardly from said cylinder end terminal structure, said mid-level bracing structure being such as to hold said hydraulic ram assembly in stable condition effectively aligning the extension of said ram end for entry of said hitching pin into said hitching opening of said draw bar.

2. The hitch attachment of claim 1 wherein the distance between said hitching opening and said inner united end of said draw bar is at least about 15 inches and not over about 30 inches, and wherein said draw bar is braced by a pair of lateral brace arms permanently united laterally on said draw bar at a location between the ends of said draw bar and extending to and permanently affixed at locations on said base plate spaced laterally from the union of said draw bar inner end to said base plate, and an upper brace arm permanently united to said draw bar at a location closer to said base plate than to said hitching opening and angularly extending upward from said draw bar to a location on said base plate above said united inner end of said draw bar, said brace arms being effective to brace said draw bar in a rigid condition with respect to said base plate.

3. The hitch attachment of claim 1 wherein said hydraulic ram is equipped with a forked end and said hitching pin is removably mounted in said forked end.

4. The hitch attachment of claim 1 wherein said elevated outer end of said boom is higher than the upper edge of said base plate.

5. The hitch attachment of claim 1 wherein said circumscribing bracing structure includes a link capable of being temporarily removed to allow removal of said hydraulic ram assembly from said mid-level bracing structure and replacement of a different hydraulic ram assembly in said mid-level bracing structure.

6. The hitch attachment of claim 1 additionally including hydraulic conduits on said hydraulic ram assembly, said conduits being adapted to be connected to a hydraulic source on a front end loader that can be controlled from the cab of the front end loader by an operator and thus permit the operator to hitch and unhitch towable vehicles to said hitch attachment while remaining in the cab.

7. A method of moving towable vehicles by a front end loader comprising the steps of (i) forming a hydraulically operable front end hitch attachment satisfying the requirements of claim 1, (ii) mounting said hydraulically operable front end hitch attachment in a locked condition on the toe-heel attachment carrier of a front end loader for adjustment of said hitch attachment with said carrier as a unit in tilt and elevation, (iii) moving said front end loader equipped with said hydraulically operable front end hitch attachment into a position with respect to the tongue of a towable vehicle so that the hitching opening of the draw bar of the hitch attachment is placed under a hitch opening in the tongue of the towable vehicle, (iv) activating said hydraulic ram by the operator without said operator leaving the cab of the front end loader while said hitching opening of said draw bar is under said hitch opening of said tongue, said activation being such that said hitching pin on said hydraulic ram passes through the hitch opening of the tongue and into the hitching opening of the draw bar, and (v) thereafter moving said towable vehicle in a towing or pushing fashion to a location as desired.

8. A hydraulically operable front end hitch attachment easily removably mountable onto the toe-heel attachment carrier of a front end loader to permit cab-controlled hitching and unhitching of towable vehicles, said hitch attachment consisting essentially of a vertically orientable rectangular base plate having opposite face sides and lateral edges and upper and lower edges, a toe-heel receiver for a front end loader toe-heel attachment carrier on one said face side, and a hydraulically operable hitch on the other said face side, (i) said toe-heel receiver comprising an upper lip flange projecting downwardly from the upper edge of said base plate at an acute angle with respect to said one side of said base plate and a lower lip flange projecting downwardly from the lower edge of said base plate to form an obtuse angle with respect to said one side of said base plate, said lower lip flange including one or more openings for receiving a locking means, said toe-heel receiver being adapted to be mounted upon the toe-heel attachment carrier of a front end loader and adapted to be locked to said carrier for adjustment of said hitch attachment with said carrier as a unit in tilt and elevation, (ii) said hydraulically operable hitch consisting essentially of a draw bar assembly, a boom, a hydraulic ram assembly suspended from said boom, and a mid-level assembly for bracing said hydraulic ram assembly, (a) said draw bar assembly consisting essentially of a draw bar extending perpendicularly outward from said base plate and permanently united at its inner end to said base plate at a medial location between the lateral edges of said base plate and proximate to the lower edge of said base plate, the outer end of said draw bar being equipped with a hitching opening extending vertically therethrough, the distance between said hitching opening and said inner united end of said draw bar being at least about 15 inches and not over about 30 inches, said draw bar being braced by a pair of lateral brace arms permanently united laterally on said draw bar at a location between the ends of said draw bar and extending to and permanently rigidly affixed at locations on said base plate spaced laterally from the union of said draw bar inner end to said base plate, and an upper brace arm permanently united to said draw bar at a location closer to said base plate than to said hitching opening and angularly extending upward from said draw bar to a location on said base plate above said united inner end of said draw bar, said brace arms being effective to brace said draw bar in a rigid condition with respect to said base plate, (b) said boom having inner and outer ends, said boom being permanently rigidly united at its inner end to said base plate at a location proximate to the upper edge of said base plate and projecting angularly upward and outward from said base plate to an elevated outer end location above said hitching opening of said draw bar and above the upper edge of said base plate, (c) said hydraulic ram assembly having a hydraulic cylinder at one end and a hydraulic ram at the other end, said cylinder end being equipped with a terminal structure by which said ram assembly is removably suspended from said elevated outer end of said boom so as to form an acute angle with said boom, and said ram end being extensible and retractable and being equipped with a terminal hitching pin removably mounted thereto, (d) said mid-level assembly comprising a mid-level bracing structure of laterally spaced arms mounted to said base plate at a location proximate to the union of the inner end of said boom to said base plate, said bracing arms extending outward from said base plate to a circumscribing bracing structure that surrounds said hydraulic cylinder at a location spaced downwardly from said cylinder end terminal structure, said circumscribing bracing structure including a link capable of being temporarily removed to allow removal of said hydraulic ram assembly from said mid-level bracing structure and replacement of a different hydraulic ram assembly in said mid-level bracing structure, said mid-level bracing structure being such as to hold said hydraulic ram assembly in stable condition effectively aligning the extension of said ram end for entry of said hitching pin into said hitching opening of said draw bar, and (iii) hydraulic conduits on said hydraulic ram assembly, said conduits being adapted to be connected to a hydraulic source on a front end loader that can be controlled from the cab of the front end loader by an operator and thus permit the operator to hitch and unhitch towable vehicles to said hitch attachment while remaining in the cab.

* * * * *